United States Patent
Alonso Cebrian et al.

(10) Patent No.: US 9,832,192 B2
(45) Date of Patent: Nov. 28, 2017

(54) COMPUTER IMPLEMENTED METHOD TO PREVENT ATTACKS AGAINST AUTHORIZATION SYSTEMS AND COMPUTER PROGRAMS PRODUCTS THEREOF

(71) Applicant: TELEFONICA DIGITAL ESPANA, S.L.U., Madrid (ES)

(72) Inventors: Jose Maria Alonso Cebrian, Madrid (ES); David Barroso Berrueta, Madrid (ES); Jose Maria Palazon Romero, Madrid (ES); Antonio Guzman Sacristan, Madrid (ES)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 0 days.

(21) Appl. No.: 14/312,269

(22) Filed: Jun. 23, 2014

(65) Prior Publication Data
US 2014/0380431 A1    Dec. 25, 2014

(51) Int. Cl.
*H04L 29/06*    (2006.01)

(52) U.S. Cl.
CPC .......... *H04L 63/0869* (2013.01); *H04L 63/08* (2013.01); *H04L 63/0838* (2013.01)

(58) Field of Classification Search
CPC ... H04L 63/086; H04L 63/0838; H04L 63/08; H04L 63/0807; H04L 63/0815; H04L 63/0853; H04L 63/0869; H04L 63/0884; H04L 63/0892; G06F 21/6218
USPC .......................................................... 726/4
See application file for complete search history.

(56) References Cited

U.S. PATENT DOCUMENTS

| | | | | |
|---|---|---|---|---|
| 9,191,381 B1* | 11/2015 | Popp | ........................ | G06F 21/34 |
| 9,628,460 B2* | 4/2017 | Leong | ................... | H04L 9/3215 |
| 2005/0216555 A1* | 9/2005 | English | ................... | G06Q 50/18 |
| | | | | 709/204 |
| 2008/0301785 A1* | 12/2008 | Beyer | ..................... | H04L 63/08 |
| | | | | 726/5 |
| 2011/0287739 A1* | 11/2011 | Cajigas Bringas | ..... | H04L 63/18 |
| | | | | 455/410 |
| 2013/0174241 A1* | 7/2013 | Cha | ..................... | H04L 63/0815 |
| | | | | 726/7 |
| 2013/0312073 A1* | 11/2013 | Srivastav | .............. | H04L 9/3215 |
| | | | | 726/7 |
| 2014/0020073 A1* | 1/2014 | Ronda | ..................... | G06F 21/31 |
| | | | | 726/7 |

OTHER PUBLICATIONS

Rigney, et.al, Remote Authentication Dial in User Service (RADIUS), The Internet Society [online] ©2000, [retrieved on Jun. 6, 2015]. Retrieved from the internet<URL: https://tools.ietf.org/html/rfc2865>.*

(Continued)

*Primary Examiner* — Minh Dinh
(74) *Attorney, Agent, or Firm* — Sughrue Mion, PLLC (57) ABSTRACT

A computer implemented method and computer program products to prevent attacks against authorization systems
The computer implemented method comprising controlling the access to different resources and actions defined for a user by a first server, reducing the exposure time at which such operations are available and establishing a dual channel verification through the use of a second server.
The computer programs implement the method.

10 Claims, 3 Drawing Sheets

(56) References Cited

OTHER PUBLICATIONS

Rigney, et.al, Remote Authentication Dial in User Service (RADIUS), The Internet Society [online] © 2000, [retrieved on Jun. 6, 2015]. Retrieved from the internet:<URL: https://tools.ietf.org/html/rfc2865>.*

* cited by examiner

COMPUTER IMPLEMENTED METHOD TO PREVENT ATTACKS AGAINST AUTHORIZATION SYSTEMS AND COMPUTER PROGRAMS PRODUCTS THEREOF

FIELD OF THE ART

The present invention is directed, in general, to authentication and authorization systems, and more particularly to a computer implemented method and computer program products to prevent attacks against authorization systems in which the access to different resources and actions defined for a user are controlled.

BACKGROUND OF THE INVENTION

In recent years, web fraud detection market has increased considerably, so innovation in authentication and authorization processes has become of great importance.

The increasing complexity of applications has led to the adoption of many increasingly sophisticated security techniques. One of the classifications that can be proposed for the study of these security techniques allows distinguishing between authentication solutions and authorization solutions. The authentication techniques are designed to verify a person is the one who claims to be. In order to add more reliability in verifying that actually a person corresponds to the identity that is being checked, many alternative authentication schemes can be taken or the number of factors to build this authentication can be extended.

There are many solutions designed to strengthen the authentication processes and, by extension, to fortify the authorization processes. Once users have been securely identified, there are authorization schemes that allow flexibility and robustness in assigning permissions to users to ensure secure access to system resources. However, there are threats which cannot yet be thwarted by adopting any of the existing schemes for the authentication/authorization, or this adoption is too expensive to afford it. These threats directly affect the way the access to specific resources is performed. A method to address these threats involves the designing of brand new security mechanisms. These mechanisms must guarantee that once the identity of a user has been verified and the level of authorization to a resource for this user has been checked, the actions taken by the user of that resource are not intercepted and modified by any attacker.

In any authorization model different techniques that facilitate access to various system resources are included. The user role information, the access control data provided when the user is authenticated, are examples of information that can be used to determine whom to give access to what resources and how this access has to be guaranteed. Ultimately, determining what should be accessed by the users, will be specified for each application. For this reason, sometimes it will be difficult to provide a general authorization scheme. It will be necessary to define an application-specific logic to determine what users can access and how they would perform these accesses. From this idea, there are many solutions that propose secure and flexible schemes for the implementation of the authorization. In all these solutions, the security must be guaranteed by the correct selection of the authentication mechanism and a correct implementation of the selected authorization scheme.

Some of the solutions provide flexibility by defining their own SDK to encourage the use of their schemes for authentication/authorization. Today, most of the SDK are based on concepts introduced by OAuth and do not suppose a risk by themselves. This applies to Microsoft Live Connect, Facebook PHP SDK and Windows 8 SDK Authentication Broker. If they exist, the threats should come from a deficient use of these SDK. In fact, regardless of threats derived by a poor implementation of the scheme chosen, most of the threats that can be defined on an authorization system coincide with the threats defined for authentication systems. This coincidence has to do with the misuse of the credentials used to manage permissions granting access to resources [2], [5].

In [2] four different levels are defined in terms of the consequences of authentication and authorization errors and misuse of credentials. Level 1 is the lowest level (the most insecure) and level 4 is the highest.

Level 1—An attacker can perform repeated logon trials by guessing possible values of the token authenticator. An attacker is also able to replay previously captured messages (between a legitimate user and a verifier) to authenticate as that user to the verifier. NIST recommends the usage of a single or multi-factor authentication with no identity proof in order to provide protection against these online guessing and replay attacks.

Level 2—An attacker can listen passively to the authentication protocol to capture information which can be used in a subsequent active attack to masquerade as the user. NIST recommends the usage of single or multi-factor authentication to provide protection against these eavesdropping attacks and all the attacks from the level 1.

Level 3—The attacker positions himself or herself in between the user and verifier so that he or she can intercept and alter the content of the authentication protocol messages. The attacker typically impersonates the verifier to the user and simultaneously impersonates the user to the verifier. Conducting an active exchange with both parties simultaneously may allow the attacker to use authentication messages sent by one legitimate party to successfully authenticate to the other. NIST recommends the usage of a multi-factor authentication and wide use of OTP. It also suggests a token used for authentication to be unlocked by the user using a password or biometrics. Adopting these solutions provides protection against verifier impersonation attacks, MitM attacks and the attacks from level 2.

Level 4—An attacker is able to insert himself or herself between a user and a verifier subsequent to a successful authentication exchange between the latter two parties. The attacker is able to pose as a user to the verifier, or vice versa, to control session data exchange. On the other hand, the attacker may compromise or otherwise exploit authentication tokens and may intercept all input or output communications from the device (Man-in-the-device (MitD) attacks or Man-in-the-Browser (MitB) attacks). The attacker can do this infecting the system with malware. NIST suggests the usage of Multi-factor authentication with FIPS-140-2 certified tamper-resistant hardware (hardware tokens) [4] to get protection against these session hijacking attacks and the attacks from the level 3.

For the first three levels, attacks and existing solutions are both focused on the way of verifying the user's identity. At level 4, NIST proposes the use of solutions against session hijacking and others attacks over authentication processes. This session hijacking involves an attacker takes advantage of the legitimate exchange of credentials that a user makes to comply with the authentication process. Once this validation is accomplished, the attacker then intervenes in the communication that takes place. This type of attack can be implemented in two ways: actively acting, hijacking the connection and leaving out of it to the legitimate user, or, remaining hidden and modifying the content of communication transparently to the user. Whatever the implementation of this attack, it is important to observe that this is an attack aimed at breaking the authorization system, leaving intact, though useless, the authentication system. Although there are alternatives to proactively protect systems from this threat, there is no adequate solution to mitigate the effects of the attack once the device from which the resource access is requested, is committed.

NIST suggests employing FIPS-140-2 certified tamper-resistant hardware (hardware tokens) [4]. Using these devices provides the users the ability to generate a single use password (one time password, OTP) to prove their identity to each transaction. In addition, there are hardware implementations of these tokens that can generate other OTPs coded to contain information on how to complete a specific transaction.

Different criteria can be defined to establish comparison between authentication/authorization schemes. In [1] the authors suggest the need to define three criteria in order to perform an effective comparison. These aspects are: security, usability and complexity on implementation (deployability). This paper presents an intensive study to instrument the comparison through the definition of metrics. Following table summarizes the metrics defined for each criterion.

| Usability | Memory-Effortless |
| --- | --- |
| | Scalable-for-Users |
| | Nothing-to-Carry |
| | Physical-Effortless |
| | Easy-to-Learn |
| | Efficient-to-Use |
| | Infrequent-Errors |
| | Easy-recovery-from-Loss |
| Deployability | Accessible |
| | Negligible-Cost-per-User |
| | Server-Compatible |
| | Browser-Compatible |
| | Mature |
| | Non-Proprietary |
| Security | Resilient-to-Physical-Observation |
| | Resilient-to-Targeted-Impersonation |
| | Resilient-to-Throttled-Guessing |
| | Resilient-to-Unthrottled-Guessing |
| | Resilient-to-Internal-Observation |
| | Resilient-to-Leaks-from-Other-Verifiers |
| | Resilient-to-Phishing |
| | Resilient-to-Theft |
| | No-Trusted-third-Party |
| | Requiring-Explicit-Consent |
| | Unlikable |

In the case of security criterion, the proposed metric set summarizes all the aspects that are usually estimated in defining a threat model. In the definition of these models it is necessary to adopt a number of decisions. And these decisions define the working scenario. For example in the case of OAuth 2.0 [5] the adopted assumptions are as follows:

The attacker has full access to the network between the client and authorization servers and the client and the resource server, respectively. The attacker may eavesdrop on any communications between those parties. He is not assumed to have access to communication between the authorization server and resource server.

An attacker has unlimited resources to organize an attack.

Two of the three parties involved in the OAuth protocol may collude to mount an attack against the third party. For example, the client and authorization server may be under control of an attacker and collude to trick a user to gain access to resources.

Attending to the metrics introduced above, is possible to determine that solutions corresponding to the higher security level (level 4) have poor performance in deployability and usability. Once the assessment of a system permits determining which level is to be deployed in the system's authentication system, it is necessary to evaluate if the users are authenticated safely and correctly. Although there are some tools that aid in this task [3], [6], deploys in the level 4 are difficult to evaluate correctly. In terms of usability, the use of tampering resistant hardware tokens goes against the adoption of these solutions by users, and it has been proved that this situation leads to a misuse of the credential systems. These tokens are expensive. They are independent devices that the user has to custody and that can be employed with one service provider only. If the users have to deal with more than one service provider that has adopted these tampering resistant hardware tokens, they have to take into custody as many tokens as service providers they have.

Furthermore, in terms of authorization, in [7] the authors explain that, aside from some security issues of each SDK, developers who choose to integrate with one of them make assumptions that can lead to security problems. This is because SDKs are often not well documented and the security exploits nearly always stem from attackers who find ways to violate these assumptions system implementers relied upon.

Along with these difficulties, other problems must be considered to understand the constant increase in fraud arising from the theft of digital identities. For instance, it is not possible to measure a homogeneous security level in all users' digital accounts. It is needed a solution that can equalize the security level of all digital accounts that a user owns. This solution should extend this security not only to the authentication processes but also to the resource authorization processes and all procedures related to such accounts.

Therefore, a different approach is needed to improve the overall security in the authentication/authorization systems, whatever is the scheme or schemes adopted, minimizing the impact on the usability and deployability of these systems.

REFERENCES

[1] Bonneau, J., Herley, C., van Oorschot, P. C., & Stajano, F. (2012, May). The quest to replace passwords: A framework for comparative evaluation of web authentication schemes. In Security and Privacy (SP), 2012 IEEE Symposium on (pp. 553-567). IEEE.

[2] Burr, W. E., Dodson, D. F., & Polk, W. T. (2006). Electronic authentication guideline. NIST Special Publication, 800, 63.

[3] Dalton, M., Kozyrakis, C., and Zeldovich, N., Nemesis: Preventing Authentication & Access Control Vulnerabilities in Web Application, In Proceedings of the 18th conference on USENIX security symposium, (pp. 267-282) USENIX Association.

[4] Evans, D., Bond, P., Bement, A., Security Requirements for Cryptographic Modules, FIPS PUB 140-2 -FEDERAL INFORMATION PROCESSING STANDARDS PUBLICATION. Online Resource: http://csrc.nist.gov/publications/fips/fips140-2/fips1402.pdf

[5] McGloin M. & Hunt P. (2013, January) OAuth 2.0 Threat Model and Security Considerations. ISSN: 2070-1721. Online resource: http://tools.ietf.org/pdf/rfc6819.pdf.

[6] Sun, F., Xu, L., & SU, Z. (2011, August) Static detection of Access control vulnerability in web applications. In Proceedings of the 20$^{th}$ USENIX conference on Security (pp. 11-11). USENIX.

[7] Wang, R., Zhou, Y., Chen, S., Qadeer, S., Evans, D., & Gurevich, Y. (2013). Explicating SDKs: Uncovering Assumptions Underlying Secure Authentication and Authorization (Vol. 37). Microsoft Research Technical Report MSR-TR-2013.

DESCRIPTION OF THE INVENTION

To achieve the above, the invention provides a solution to prevent several attacks related with authentication and authorization processes. This solution consists in a solution that is designed to limit the time in which an attacker is able to develop an attack. Therefore, this solution supposes a limit on the resources available to an attacker to organize and attack. First, the invention seeks to reduce the risk of an attack directed to an authentication/authorization process by temporarily blocking the operation execution mechanism. Thereby decreasing the period of exposure of these systems and, therefore, decreasing the chances of success of attack on the system. In addition, a first server or service provider can force the use of a second authentication phase (using an OTP infrastructure) for service providers who do not provide this option in their account management processes or even let the user activate it.

According to a first aspect there is provided a computer implemented method to prevent attacks against authorization systems, comprising: receiving at least one first server a request in the name of a user to be logged into a service of said first server; and authorizing said request, said first server, by verifying user identification information of said user.

On contrary of the known proposals, and in a characteristic manner, in order said request to be authorized the method further comprises:

sending, by said first server to a second server in connection with a user computing device with a dedicated program, a request about a status associated to said user;

initializing a credential exchange between said first and second server in order to provide mutual authentication;

verifying said associated status that has been previously set as valid or as invalid by said user and stored in a memory of said second server;

sending, said second server, said associated status to said first server; and using said first server said received associated status for:
authorizing said request for said service in the name of said user if said associated status is set as valid, or rejecting said request for said service if said associated status is set as invalid, wherein in case said request to be logged into a service of said first server being authorized, and a request is done in the name of said user to perform an operation in said first server using at least a part of the resources of said first server, the method comprises following steps:

performing, an operation status verification associated to said user comprising a status request to said first server to determine what entry in a scheme corresponds with said operation;

receiving, said second server from said first server said request about an operation status associated to said user concerning said entry;

initializing a credential exchange between said first and second server;

evaluating, said second server a scheme entry status from a root to said entry;

sending, said second server an evaluation result to said first server;

making a decision, said first server, by at least using said received result for allowing or blocking said request in the name of said user to perform said operation.

The status request associated to the user comprises the sending of a security token, said security token being generated during a previous pairing user accounts process. This token links the user with the first server without disclosure of any personal information of the user to the second server information. Then, the token is securely stored in a memory of the first server and in a memory of the second server once the user has configured the pairing of the first and second servers' identifications.

The credentials exchange to secure mutual authentication between the first server and the second server, is performed, preferably, via a standard authentication procedure based on certificates' exchange defining, as a result, a secured channel. The exchange is performed to verify that both first server and second server are who they claim to be.

The second server may notify the user in case said request to be logged into a service of the first server is rejected. For instance, by the sending of a Short Message Service (SMS), of an email, of or a message by a smartphone messenger application, or just by the highlighting or pushing in said dedicated program of said user computing device.

Optionally, the step of evaluating the scheme entry status performed by the second server may further include a second factor authentication comprising, if said scheme entry status is set as valid:

sending, said second server an OTP to the first server within the result of the operation status request;

requesting, the first server to the user, an OTP that the user is going to use as temporal second factor;

sending, the second server the same OTP sent to the first server to the user through said another user dedicated program;

recovering, the user, said requested temporal second factor OTP through said dedicated program, introducing it into said another user dedicated program and further sending it via said another user dedicated program to the first server; and checking, the first server, if the received OTP from the second server and the received temporal second factor OTP from said another user dedicated program matches in order to allowing or blocking said request in the name of said user to perform said operation.

The associated status is set as valid (unlocked) or as invalid (locked) a certain period of time and can be modifiable by the user whenever the latter want it. For instance, the user can plan a locking/unlocking policy to automate the management of their accounts held with different servers using different criteria: time, geo-localization (different policies for home, work, etc.). Another possibility for modifying said associated status can be by delegating the control said user has of their accounts to other users. This can be done by considering two different options. In the first one, a parental control mechanism is used so the children's (original) accounts access control is delegated to the parent control mechanism. In the second one, a single account allows multiple locks. In this latter case, the unlock action will require that multiple users unlock their locks concurrently. In both cases, the delegation is performed securely maintaining the privacy of every user unchanged.

The request to be logged into a service and/or the request to perform an operation may be recorded in order to provide statistics. In this way, the user can obtain system usage statistics that reflect activity of the system and track the attempts of impersonation. These statistics inform about when someone had attempted to access to a service with user's username.

The subject matter described herein can be implemented in software in combination with hardware and/or firmware, or a suitable combination of them. For example, the subject matter described herein can be implemented in software executed by a processor.

According to another aspect there is provided a computer program comprising computer program code means adapted to perform the steps according to the method described above when said program is run on a computer, a digital signal processor, a field programmable gate array, an application-specific integrated circuit, a micro-processor, a micro-controller, or any other form of programmable hardware.

Embodiments of the invention also embrace a computer program product including program code means adapted to perform a second factor authentication according to the method described above.

The present invention allows the user to plan a locking/unlocking policy to automate the management of accounts held with different servers using different criteria: time, geo-localization (different policies for home, work, etc.); delegate the control of their accounts to other said second server users; enable monitoring systems that allow users to be warned of identity theft attempts or untrue user's impersonation in operation execution requests, providing a course of action to take action to control the digital identity; establish a second factor for authentication for verifiers that are not providing it; establish an account to be blocked or unblocked and change it with immediate effect by the use of a switch control; fix a schedule to Valid/Invalid (Block/Unblock) an account or said operation automatically based on time and date settings. Once a check-status request is received the second server responds based on the current state of the scheduler; improve the security level of an account or said operation by configuring a second factor authentication integrated with second server; control different actions associated with an account, authorizing or banning the execution of them in a compatible manner with the authorization scheme established.

Furthermore, the invention allows homogenizing the security level for all the different accounts a user has. It allows offering a security level comparable with level 4 defined by NIST. And this is done for different accounts that can be now controlled with only one device and regardless of the authentication/authorization scheme defined for every service provider.

The invention does not propose any new authentication/authorization scheme. Indeed, the intention is to complement the existent schemes with an extra security layer. Although this may limit its usability and deployability, the invention design is oriented to minimize the impact over these criteria. As it is stated before, the authentication scheme choice determinates the security risk that is assumed for an authorization system. What is proposed here is to reduce the risk taken with the choice of any authentication/authorization mechanism reducing the time in which this system is accessible to be broken.

Assuming that there is a relationship between the success and failure of an attack on the auth system with the time in which this system is accessible (exposure time) as conditional probability (p(SuccessfulAttack|exposed)) is possible determining that the relative risk (RR) satisfies the following expression:

$$RR = \frac{p(SuccessfulAttack \mid exposed)}{p(SuccessfulAttack \mid unexposed)} > 1 \qquad \text{Eq. 1}$$

In this expression it is assumed that the probability of success of an attack is directly related to the exposure time. That is, the continuous exposure of a computer system, in this case the authentication system, increases the likelihood of success of an attack in contrast with a scenario in which the exposure is limited. In the same way one can evaluate the following expression:

$$\frac{\frac{p(SuccessfulAttack \mid exposed)}{p(FailedAttack \mid exposed)}}{\frac{p(SuccessfulAttack \mid unexposed)}{p(FailedAttack \mid unexposed)}} > 1 \qquad \text{Eq. 2}$$

Indicating that there is a greater probability for a successful attack if exists a continued systems exposure. It is also possible to estimate the portion of all successful attacks that could have been avoided if the exposure had been avoided (Attributable Risk Percent (ARP)). This is calculated with expression 3.

$$ARP = \frac{RR - 1}{RR} \qquad \text{Eq. 3}$$

This expression allows assessing the investment required to enable a solution designed to reduce the time that is accessible authentication process. The professional experience and technical knowledge of the documented attack techniques to break authentication/authorization systems confirm the assumption made earlier (RR>1). Therefore, it can be asserted that ARP>1 once the Account-locker is adopted.

This reduction in the exposure time allows mitigating the effects of most of the threats related with the authentication phase before a user can access to some privileged resources. This invention also permits reducing the exposure of particular actions that can be taken after the login process has been accomplished. Therefore, this exposure reduction supposes the limitation in the time in what the action can be executed and the establishment of a channel that allow to send critical information to assure the integrity of this action execution.

The invention encompasses the solutions for the threats defined by NIST. But, in this case, these solutions are provided to users through a dedicated program designed to be executed in a mobile device, which facilitates the interaction with a second server. In addition, this second server brings privacy in the communications relative to the control of the user's accounts and incorporates all the control information that the users have set about the actions the service providers have offered them.

BRIEF DESCRIPTION OF THE DRAWINGS

The previous and other advantages and features will be more deeply understood from the following detailed description of embodiments, with reference to the attached, which must be considered in an illustrative and non-limiting manner, in which.

DETAILED DESCRIPTION OF SEVERAL EMBODIMENTS

Figure 1:
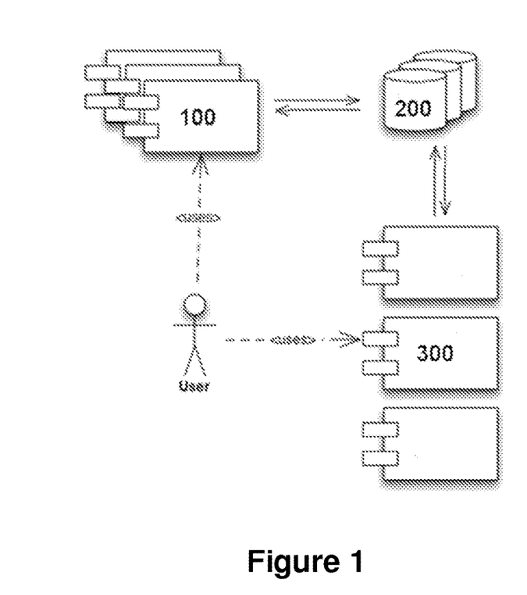
FIG. 1 is an illustration of the present invention general architecture.

In reference to FIG. 1 it is showed the general architecture of the present invention. Concerning FIG. 1, a user computing device 100 such as a mobile phone, a smartphone, a tablet-PC or a PDA among any other, is used by said user in order to login into a dedicated program 102 in communication with a second server 200 and to manage the status for every first server 300 with which a user wants to request a service.

With this new proposal said user 100 can unblock said operation defined for a particular account created with said first server 300. As stated below, this action can enhance the control defined for this account by decision of the first server 300. In this decision, the first server 300 can choose to incorporate a new control of security beyond the block/unblock default option or the second factor of authentication. This control of security consists of to provide a communication channel from the user 100 to the first server 300, through the second server 200. The first server 300 can configure the system to ask the user 100 for a particular information related to said operation to be performed. This information can be used by the second server 200 to verify if the user 100 is who actually is demanding said operation and to confirm if the operation that has arrived to the first server 300 is exactly as the one the user 100 had ordered.

Assuming that the first server 300 could want to verify the integrity of the operation, the first server 300 can select what parameters are critical to ensure the integrity of the operation. In this case, it is important that the requested information corresponds unequivocally with the operation critical parameter in order to identify it correctly.

In this architecture, the user 100, besides having an account in the second server 200, can have multiple accounts with different service providers. One of these service providers is the first server 300. Once the user 100 completes the login process with these accounts he or she will have access to multiple operations specific to each service providers. The second server 200 eases how a first server 300 can integrate this control within the logic of its applications.

When a first server 300 decides to integrate its services, it will provide the ability to link their accounts with the accounts that the user 100 has in the second server 200. When the said user 100 decides to establish this link, she or he starts a pairing process that ensures complete privacy to the user 100. Once the pairing process is completed, the user 100 can access the configuration of the control of the account with the first server 300 from a dedicated program 102 (i.e. a mobile application).

Every time the settings associated with an account are changed on said mobile application, this modification is immediately propagated to the second server 200 to change the status of the account that can be accessed by the first server 300.

Second server core implements the main function of the second server 200: lock or unlock said user account with the first server 300 and the operations provided by first server 300. In order to do that, the second server 200 accepts and processes the check-status requests sent from the first server 300. This second server 200 also manages all data about the links with said first server 300 defined by the user 100 and the requests for the pairing of new locks. The key is the user 100 is never asked for any private information. Once the user 100 creates his account with second server 200, he can establish locks with different service providers, like said first server 300. To activate these locks the second server 200, according to an embodiment, generates a token. A unique token and the definition of secured channels are needed to complete the pairing process between the user 100 and the first server 300. As result of this pairing process, the cryptographic token is sent from the second server 200 to the first server 300 who has to store this information with their user's personal data. Later, this cryptographic token will be used to request the corresponding lock status. The user 100 can modify the status of their locks, by the activation or configuration of the different options that second server 200 provides.

In case the user 100 has set up a lock with a second factor for authentication over an account or a particular action, the second server 200 will incorporate all the needed logic for the generation and communication of the OTP. When the second server 200 receives a request from the first server 300 asking for the user account status, a second factor of authentication is triggered. An OTP is generated and sent to the user 100. The same OTP is sent to the first server 300 along with the account status. If the status is ON and the user 100 has activated the second factor, the first server 300 should prompt the user to introduce the OTP to proceed with the operation.

Now, if the user 100 has set up a lock over a said operation with an integrity factor to verify that the operation parameters have not been modified, said second server 200 incorporates the needed logic to get the critical information from the user 100 and from the first server 300 and to check if both are equal. The second server 200 sends the result of the checking as the account status to the first server 300. In case of mismatching, the first server 300 can conclude that an intruder can be intercepting the information from the user 100. The first server 300 can then build mechanisms to elude the fraud and to raise security alerts.

Figure 2:
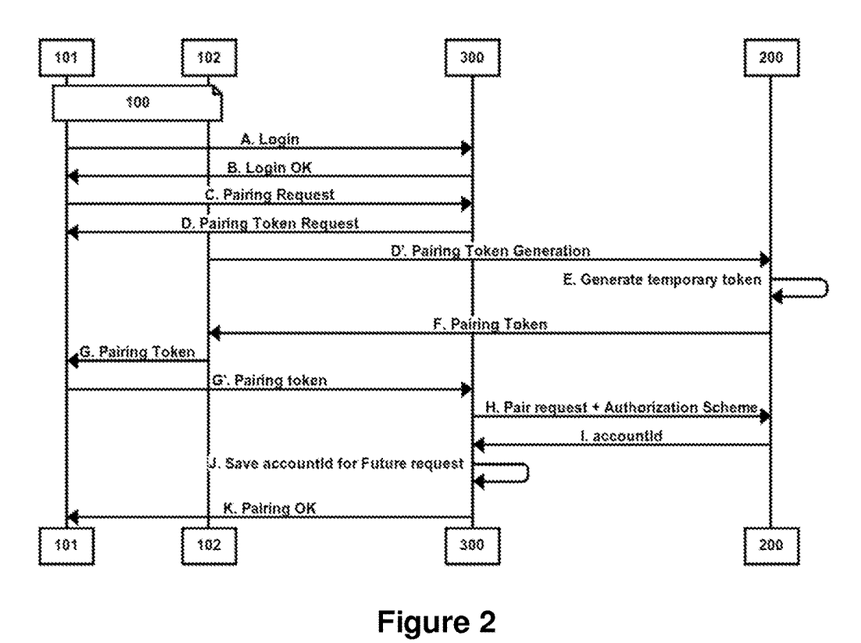
FIG. 2 is a flow diagram illustrating an account pairing sequence with authorization.

In reference to FIG. 2 it is illustrated a pairing process of the user 100 account of the second server 200 with different accounts for different first servers 300. In FIG. 2, once a user 100, using for instance the dedicated program 101 such as a browser, has completed the login process (A-B) with a first server 300 (in this particular case a Bank online, a social network, a credit card providers, etc.), the user 100 decides to perform said accounts' pairing process. The user 100 requests the pairing to the first server 300 (C) using the browser 101. As response, the first server 300 asks for a pairing token (D). The user 100 then uses the dedicated program 102 (D') to get this pairing token from the second server 200, after a previous login process. The second server 200 generates a token (for instance as an OTP) (E) and sends it to the user's dedicated program 102 (F). This token can be used for several pairing processes meanwhile it is valid. The user get the token (OTP) from the dedicated program 102 and introduces it in the web page displayed in the browser 101 by the first server 300 (G-G'). The first server 300 then sends the received token to the second server 200, after a previous credentials exchange (H). If the first server 300 identity is validated, the second server 200 stores the link between the user 100 and the first server 300 and generates a new token that identifies this link. This token (accountID) is sent to the first server 300 (I) and there it is stored for future communications (J). At last, a pairing acknowledges is sent to the user's browser 101 (K).

Figure 3:
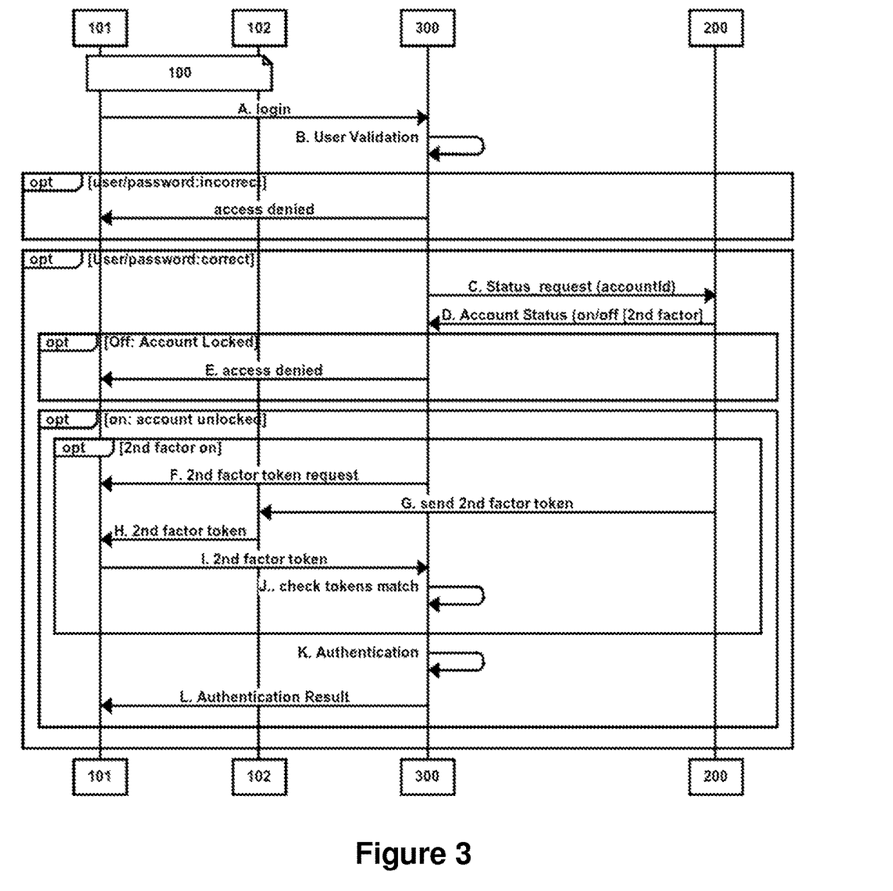
FIG. 3 is a flow diagram illustrating how a status of a user account can be checked for authentication.

In reference now to FIG. 3 it is illustrated how a status of a user account can be checked for authentication. In FIG. 3, a user 100, using for example a browser 101, requests to be logged in a service (A) of a first server 300 so once user existence has been validated (B) by said first server 300, the latter demands to the second server 200 the user account status (C). Then the second server 200 initializes the credentials exchange before the result of the account status information is sent (D). With the result status, the first server 300 makes the decision of allowing or blocking the user access (E).

In an embodiment, if the account status is unlocked or valid but the second factor of authentication is on, within the answer of the status request, the second server 200 sends an OTP to the first server 300 that has to employ to complete the authentication. The first server 300 then requests to the user 100 the OTP that is going to be a temporal second factor (F). Then the second server 200 sends the same OTP to the to the user's dedicated program 102 (G). The user 100 recovers the OTP from the dedicated program 102 and introduces it in the browser 101 (H) and sends it to the first server 300 (I). The first server 300 can check if the OTP sent through the browser 101 matches with the one received with the account status (J). Depending on of the results of this verification, the first server performs the authentication process (K) and communicates the result to the user via 101.

When a first server 300 sends a Status Request, the second server 200 understands that someone, with the proper service identification information (i.e. ID and password), is trying to access to the service. If the account status is set as blocked, or if this request has come in a moment that is not included in the interval defined by the user 100, the second server 200 registers this event as a fake attempt. The second server 200 could send, according to an embodiment, an alert of this event to the user if said user has configured it so (for instance by sending a Short Message Service (SMS), an email, a message by a smartphone messenger application, by a highlighting or pushing in said dedicated program 102 of said user computing device 100, etc.) or just update the statistics for a later revision. Then the second server 200 returns the status associated with the account as locked.

With the aim of improving the security of any authorization system, the use of the said second server 200 is proposed as a new layer that gives the users the chance of control the access to the resources and procedures associated with their accounts defined with any first servers. These resources and procedures are seen as operations which depend on the main actions defined for an account (i.e. login process). This dependency is established like a hierarchy where the changes in the root entries are propagated to their children.

Figure 4:
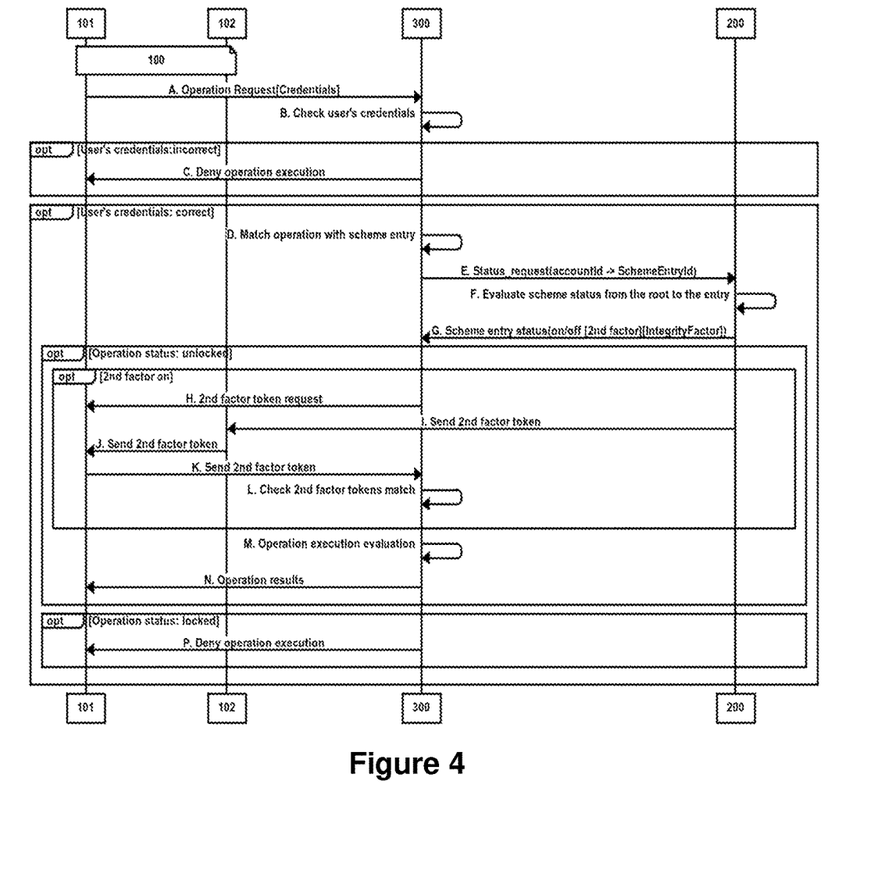
FIG. 4 shows the flow diagram that summarizes the way the process introduced in FIG. 3 can be extended to its generalization, adopting the authentication process as other operation from the directory proposed by first server.

In this embodiment, in reference to FIG. 4 it is showed the operation status verification process. This operation is proposed by the first server 300 attached to the account management. The user 100, using for example a browser 101, requests, according to an embodiment, to execute an operation related with an account (A) of a first server 300. This operation can be to be logged in a particular service or to execute some other action related with the services provided by first server (e.g. Internet payment with a credit card). So once user existence has been validated (B) by said first server 300, the latter makes the correspondence of the operation requested with the scheme entry in the hierarchy defined by this user's account (D) and demands to the second server 200 this entry status (E).

Then the second server 200 initializes the credentials exchange before evaluating the scheme entry status from the root to the entry (F). The status of the user's account is retrieved and if it is unlocked the same evaluation is performed with every step founded until reach the scheme entry. The scheme entry status information is sent (G) and, with this information, the first server 300 makes the decision of allowing or blocking the user access to the operation.

The second factor of authentication can be activated if the scheme entry status is valid or unlocked in order to strengthen the process. The second server 200 sends an OTP to the first server 300 within the answer of the status request. This first server 300 employs it to complete the authentication. The first server 300 requests to the user 100 the OTP that is going to be a temporal second factor (H). The second server 200 sends the same OTP to the to the user's dedicated program 102 (I). The user 100 recovers the OTP from the dedicated program 102 and introduce it in the browser 101 (J) and sends it to the first server 300 (K). The first servers can check if the OTP sent through the browser 101 matches with the one received with the account status (L). The first server 300 denies operation execution if the OTPs don't fit.

The scope of the present invention is defined in the following set of claims.

The invention claimed is:

1. A computer implemented method to prevent attacks against authorization systems, the method comprising:
    receiving from at least a first server a request from a first user in a name of a second user to be logged into a service of the first server, the first user being different from the second user;
    authorizing the request, by the first server, by verifying user identification information of the first user; and
    notifying, by a second server, the second user in response to the request to be logged into the service of the first server being rejected,
    wherein the authorizing the request, by the first server, comprises:
        sending, by the first server to the second server in connection with a user computing device with a dedicated program, a request about a status associated with the second user;
        initializing a credential exchange between the first server and the second server to provide mutual authentication;
        verifying the associated status that has been previously set as valid or as invalid by the second user and stored in a memory of the second server;
        sending, by the second server, the associated status to the first server; and
        using, by the first server, the received associated status to:

authorize the request from the first user in the name of the second user in response to the associated status being set as valid, or reject the request in response to the associated status being set as invalid, and wherein, in response to the request to be logged into the service of the first server being authorized and the request from the first user being in the name of the second user to perform an operation in the first server using at least a part of resources of the first server:

performing an operation status verification associated with the second user comprising matching the operation with a scheme entry and sending a status request to the second server;

receiving, by the second server from the first server, the status request about an operation status associated with the second user concerning the scheme entry;

initializing a credential exchange between the first server and the second server;

evaluating, by the second server, a scheme entry status from a root to the entry;

sending, by the second server, an evaluation result to the first server; and making a decision, by the first server, by at least using the received result to allow or block the request from the first user in the name of the second user to perform the operation.

2. The computer implemented method according to claim 1, wherein the notifying comprises one of a sending of a Short Message Service (SMS), a sending of an email, a sending of a message by a smartphone messenger application, or a highlighting or pushing in the dedicated program of the user computing device.

3. The computer implemented method according to claim 1, wherein the associated status is set as valid or as invalid for a predefined period of time.

4. The computer implemented method according to claim 1, wherein a second factor authentication is used within an answer of the scheme entry status in response to the scheme entry status being set as valid.

5. The computer implemented method according to claim 4, wherein the second factor authentication comprises:

sending, by the second server to the first server (300), a one-time password (OTP);

requesting, by the first server from the first user, an OTP that the first user will use as a temporal second factor;

recovering, by the first user, the requested temporal second factor OTP through the dedicated program and further sending the temporal second factor OTP to the first server; and checking, by the first server, if the received OTP from the second server and the received temporal second factor OTP from the first user match in order to authorize or reject the request from the first user for the service in the name of the second user.

6. The computer implemented method according to claim 5, wherein the first server is configured to allow the operation in response to the received OTP from the second server and the received temporal second factor OTP from the first user matching and block the operation in response to the received OTP from the second server and the received temporal second factor OTP from the first user not matching.

7. The computer implemented method according to claim 1, wherein the evaluating is performed at each level in a hierarchy, from the root to the scheme entry.

8. The computer implemented method according to claim 1, wherein the request to be logged into the service and/or the request to perform the operation are recorded in order to provide statistics.

9. A non-transitory computer readable medium storing a program causing a computer to execute a method for preventing attacks against authorization systems, the method comprising:

receiving from at least a first server a request from a first user in a name of a second user to be logged into a service of the first server, the first user being different than the second user;

authorizing the request, by the first server, by verifying user identification information of the first user; and notifying, by a second server, the second user in response to the request to be logged into the service of the first server being rejected, wherein the authorizing the request, by the first server, comprises:

sending, by the first server to the second server in connection with a user computing device with a dedicated program, a request about a status associated with the second user;

initializing a credential exchange between the first server and the second server to provide mutual authentication;

verifying the associated status that has been previously set as valid or as invalid by the second user and stored in a memory of the second server;

sending, by the second server, the associated status to the first server; and using, by the first server, the received associated status to:

authorize the request from the first user in the name of the second user in response to the associated status being set as valid, or reject the request in response to the associated status being set as invalid, and wherein, in response to the request to be logged into the service of the first server being authorized and the request from the first user being in the name of the second user to perform an operation in the first server using at least a part of resources of the first server:

performing an operation status verification associated with the second user comprising matching the operation with a scheme entry and sending a status request to the second server;

receiving, by the second server from the first server, the status request about an operation status associated with the second user concerning the scheme entry;

initializing a credential exchange between the first server and the second server;

evaluating, by the second server, a scheme entry status from a root to the entry;

sending, by the second server, an evaluation result to the first server; and making a decision, by the first server, by at least using the received result to allow or block the request from the first user in the name of the second user to perform the operation.

10. The non-transitory computer readable medium according to claim 9, further comprising performing a second factor authentication wherein the second factor authentication comprises:

sending, by the second server to the first server, a one-time password (OTP);

requesting, by the first server from the first user, an OTP that the first user will use as a temporal second factor;

recovering, by the first user, the requested temporal second factor OTP through the dedicated program and further sending the temporal second factor OTP to the first server; and checking, by the first server, if the received OTP from the second server and the received temporal second factor OTP from the first user match in order to authorize or reject the request from the first user for the service in the name of the second user.

* * * * *